United States Patent
Beaver et al.

(10) Patent No.: US 10,551,957 B2
(45) Date of Patent: Feb. 4, 2020

(54) LATENCY REDUCTION FOR DETACHED CONTENT

(71) Applicant: Apple Inc., Cupertino, CA (US)

(72) Inventors: Jason C. Beaver, Cupertino, CA (US); Bruce D. Nilo, Cupertino, CA (US); Chendi Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 15/174,731

(22) Filed: Jun. 6, 2016

(65) Prior Publication Data

US 2016/0357325 A1   Dec. 8, 2016

Related U.S. Application Data

(60) Provisional application No. 62/172,116, filed on Jun. 7, 2015.

(51) Int. Cl.
*G06F 3/00* (2006.01)
*G06F 3/041* (2006.01)
(Continued)

(52) U.S. Cl.
CPC .............. *G06F 3/0416* (2013.01); *G06T 1/20* (2013.01); *G06T 1/60* (2013.01); *G06F 2203/04104* (2013.01)

(58) Field of Classification Search
CPC ....... G06F 3/0416; G06F 3/0412; G06T 1/20; G06T 1/60
See application file for complete search history.

(56) References Cited

U.S. PATENT DOCUMENTS 8,487,895 B1   7/2013 Brown
8,970,501 B2   3/2015 Hotelling
(Continued)

FOREIGN PATENT DOCUMENTS

CN   101526880 A   9/2009
CN   101673155 A   3/2010
CN   102810030 A   12/2012

OTHER PUBLICATIONS

International Search Report and Written Opinion received in PCT Patent Application No. PCT/US2016/036076, dated Aug. 22, 2016.

*Primary Examiner* — Stephen S Hong
*Assistant Examiner* — Marshon L Robinson
(74) *Attorney, Agent, or Firm* — Blank Rome LLP

(57) ABSTRACT

Systems, methods, and computer readable media to reduce latency in a graphics processing pipeline of an electronic device having a touch-sensitive input device and a display are described herein. In one embodiment, the method includes obtaining a temporal sequence of multi-touch scan data, processing the multi-touch scan data, determining an "optimal" time to deliver the processed multi-touch scan data to the relevant application(s) running on the device for processing, animating the resultant graphical changes that are determined by the application(s) based on the multi-touch input, and rendering the determined graphical changes to a frame buffer. In some embodiments, determining the "optimal" time for delivering the processed multi-touch scan data to the relevant application(s) comprises measuring the performance of the relevant application(s) in order to determine how likely it is that the necessary processing of the received multi-touch information may be completed before the conclusion of the next vertical blanking interval.

23 Claims, 10 Drawing Sheets

(51) Int. Cl.
  *G06T 1/20*    (2006.01)
  *G06T 1/60*    (2006.01)

(56) References Cited

U.S. PATENT DOCUMENTS

| | | |
|---|---|---|
| 2009/0027401 A1 | 1/2009 | Loveridge |
| 2013/0057511 A1 | 3/2013 | Shepelev |
| 2013/0057512 A1 | 3/2013 | Lillie |
| 2013/0194229 A1 | 8/2013 | Sabo |
| 2014/0071088 A1 | 3/2014 | Hong |
| 2014/0218323 A1 | 8/2014 | Hung |
| 2014/0253493 A1 | 9/2014 | Cho |
| 2015/0185931 A1* | 7/2015 | Hwang .................... G06F 9/44 345/173 |
| 2016/0188088 A1* | 6/2016 | Rodrigues De Araujo ................. G06F 3/0416 345/173 |
| 2016/0247484 A1* | 8/2016 | Chen ..................... G09G 5/399 |

\* cited by examiner

LATENCY REDUCTION FOR DETACHED CONTENT

BACKGROUND

This disclosure relates to multi-point and multi-touch enabled devices in general, and more specifically to reducing the amount of latency between touch events in multi-point and multi-touch enabled devices and the corresponding updates to the display pipeline of such devices.

Multi-touch enabled devices are known in the art. A multi-touch enabled device is a device that can sense multiple touches at the same time. Thus, a multi-touch enabled device can, for example, sense two touch events that take place simultaneously at two different positions on a multi-touch panel and are caused by two fingers being pressed down on the panel. Examples of multi-touch enabled devices are discussed in U.S. Pat. No. 8,970,501, entitled "PROXIMITY AND MULTI-TOUCH SENSOR DETECTION AND DEMODULATION," filed on Jan. 3, 2007, and hereby incorporated by reference in its entirety (hereinafter, "the '501 patent"). Multi-point enabled devices define a more general set of devices that include multi-touch enabled devices, as well as similar devices such as the multi-proximity sensor devices discussed in the '501 patent mentioned above.

While the benefits of multi-touch enabled interfaces are known, these devices can present some interface and graphics processing pipeline design challenges. More specifically, if a multi-touch interface is being used, two or more touch events can simultaneously or near-simultaneously occur at different portions of the display. This can make it difficult to split the display into different portions and have different independent software elements process interactions associated with each portion. Furthermore, even if the display is split up into different portions, multiple touch events can occur in a single portion. Therefore, a single application, process, or other software element may need to process multiple simultaneous or near-simultaneous touch events.

However, each application, process, or other software element needs to consider multiple touch interactions, so the relative overall cost and complexity of software running on the multi-touch enabled device may be quite high. More specifically, each application may need to process large amounts of near-simultaneous incoming touch data. This can require high complexity in applications responding to the incoming touch data and can result in undesirable latency between when a user touches a display and when the display is updated appropriately to reflect the user's touch act(s).

In one example, the display screen may be refreshed at a rate of 60 Hz, meaning that the "vertical blanking interval" (VBI) of the display screen is every 16.7 ms. (It is to be understood that, with a faster screen refresh rate, e.g., 120 Hz, the VBI would be decreased correspondingly, e.g., 8.333 ms, in the case of a 120 Hz refresh rate.) This means that, within some number of multiples of the VBI interval, the graphics processing pipeline needs to: process the incoming touch data; have the relevant application(s) process and handle the incoming touch data appropriately; animate the resulting changes to graphical elements (e.g., using an animation API for drawing 2D and 3D graphics, such as OPEN GL®); render the resulting content using a GPU or other graphics-specific processing unit; and write the rendered output to a frame buffer for display on the display screen at the beginning of the next-occurring VBI. (OPEN GL® is a registered trademark of SILICON GRAPHICS, INC.) One additional constraint includes the fact that most multi-touch enabled displays cannot run their multi-touch receive operation at the same time as their multi-touch scan operation (i.e., the device cannot simultaneously be receiving new touch input and attempting to determine where the immediately previous touch input was located).

As may now be more clearly appreciated, the longer that the processing; handling; animating; and rendering steps take to complete, the greater the number of VBIs that will pass between when the user touch event took place on the device display and when the display is actually updated to reflect said user touch event. This lag or "latency" between touch input and the corresponding display update response is undesirable in most situations. Therefore, what is needed is an intelligent manner of speeding up the multi-touch graphics processing pipeline that will reduce latency between touch input and display updates, but will not unfavorably affect the graphical UI experience for the user of the device.

SUMMARY

In one embodiment, the inventive concept provides a method to process multi-touch input to a device and update the device's display correspondingly with less latency. The method includes obtaining a temporal sequence of multi-touch scan data, processing the multi-touch scan data to determine at least time and location information associated with the multi-touch scan data, determining an optimal time to deliver the processed multi-touch scan data to the relevant application(s) running on the device for processing, animating the resultant graphical changes that are determined by the application(s) based on the multi-touch input, and rendering the determined graphical changes to a frame buffer. Finally, the process will update the pixels on the display at the start of the next vertical blanking interval (VBI) to reflect the newly-rendered graphics.

In some embodiments, the "optimal" time for delivering the processed multi-touch scan data to the relevant application(s) running on the device may comprise measuring the performance of the relevant application(s) in order to determine how likely it is that the relevant application(s) can complete the necessary processing of the received multi-touch information before the conclusion of the next VBI.

In other embodiments, estimating the "optimal" time for delivering the processed multi-touch scan data to the relevant application(s) running on the device may further comprise: gathering samples of past application performance timing to estimate future application performance timing; delivering multi-touch information at the earliest opportunity that will also maximize the likelihood that the application will meet the next frame deadline (i.e., complete its processing before the next VBI); dynamically approximate the application performance timing; and/or getting off to a "quick start" by "eagerly" delivering multi-touch information to gather sample data within the first few "frames" of operation.

In other embodiments, dynamically approximating the application performance timing may further comprise: utilizing a maximum application performance time as the approximated application performance time; utilizing a maximum percentile of application performance times (e.g., the $99^{th}$ percentile of application performance times) as the approximated application performance time; utilizing a sliding window of application performance times to generate the approximated application performance time; and/or a utilizing a feedback control loop to adjust future approximated application performance times.

In other embodiments, each of the above described methods, and variations thereof, may be implemented as a series of computer executable instructions. Such instructions may use any one or more convenient programming languages. Such instructions may be collected into modules and/or programs and stored in any media that is readable and executable by a computer system or other programmable control device.

In still other embodiments, each of the above described methods, and variations thereof, may be implemented by a system comprising a touch-sensitive input device, a display, a memory, and one or more programmable control devices operable to perform the above described methods as a series of computer executable instructions.

DETAILED DESCRIPTION

This disclosure pertains to systems, methods, and computer readable media to reduce latency in a graphics processing pipeline of an electronic device having a touch-sensitive input device and a display. In one embodiment, the method includes obtaining a temporal sequence of multi-touch scan data, processing the multi-touch scan data to determine at least time and location information associated with the multi-touch scan data, determining an "optimal" time to deliver the processed multi-touch scan data to the relevant application(s) running on the device for processing, animating the resultant graphical changes that are determined by the application(s) based on the multi-touch input, and rendering the determined graphical changes to a frame buffer. In some embodiments, determining the "optimal" time for delivering the processed multi-touch scan data to the relevant application(s) comprises measuring the performance of the relevant application(s) in order to determine how likely it is that the necessary processing of the received multi-touch information may be completed before the conclusion of the next vertical blanking interval.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing pipelines systems having the benefit of this disclosure.

Figure 1A:
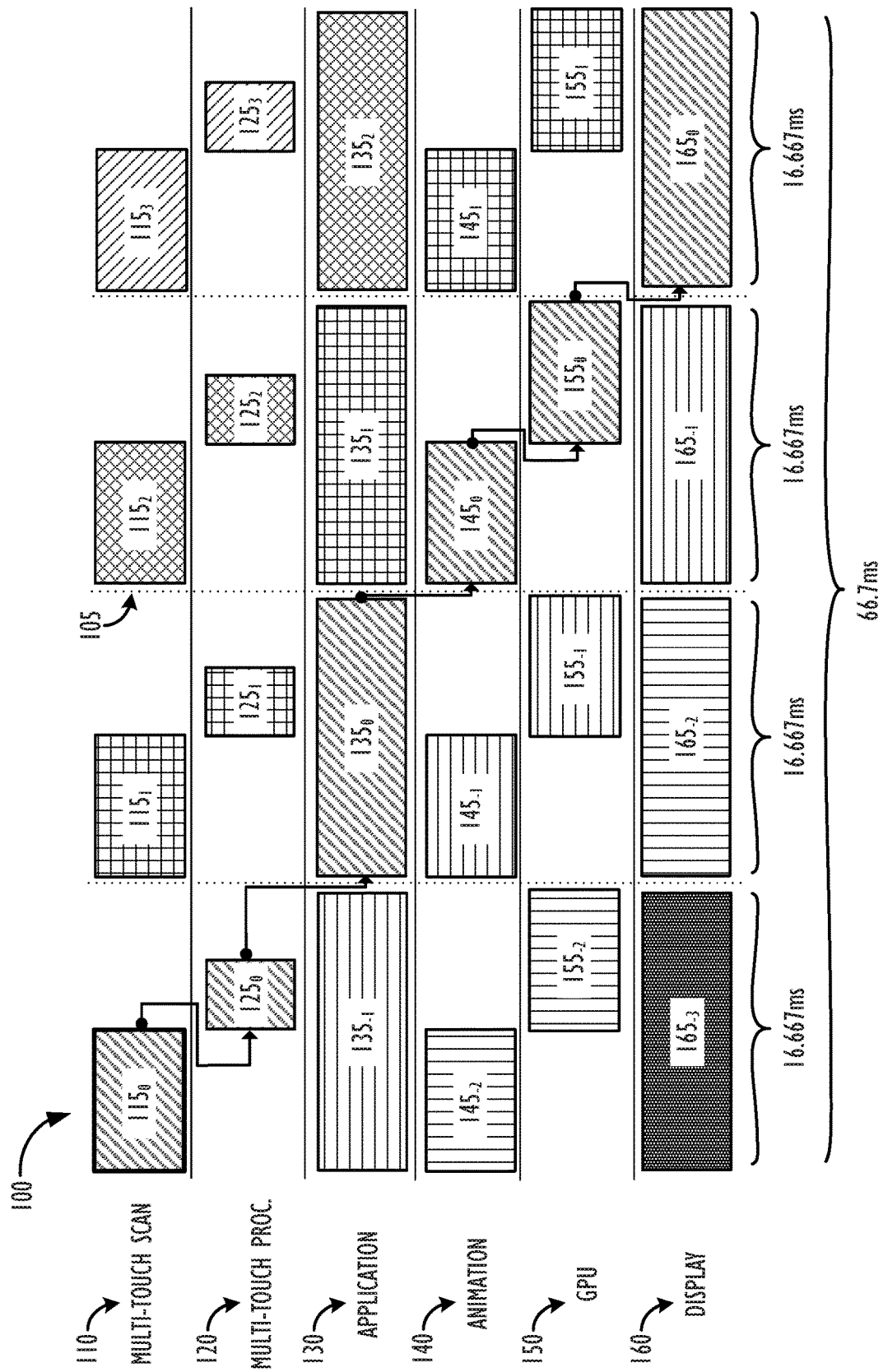
FIG. 1A shows, in timeline form, a touch-to-display latency breakdown with an ideal graphics workload, in accordance with the prior art.

Referring now to FIG. 1A, a touch-to-display latency breakdown 100 with an ideal graphics workload is shown in timeline form, in accordance with the prior art. According to one such prior art approach for handling graphics processing pipeline activities for multi-touch devices, a device having a multi touch-sensitive input first obtains a temporal sequence of multi-touch scan data 110 from its multi-touch hardware, e.g., during a first VBI. Bars 115 represent the amount of time during which the hardware multi-touch scan is taking place. The subscript '0' on the bar $115_0$ reflects the fact that that particular bar is deemed to be the "present" input for the particular example, since it is the input that is being displayed to the user of the device during the currently, i.e., "present," vertical blanking interval (see, e.g., bar $165_0$ in display row 160, which is the farthest to the right on the timeline, reflecting the fact that it is the information currently being displayed to the user). Negative subscripts, e.g., −1, −2, −3, etc., represent touch time points in the "past," as the touch event has already been processed by the graphics processing pipeline, and the display has already been updated to reflect such touch events during a previous vertical blanking interval. Positive subscripts, e.g., 1, 2, 3, etc., represent touch time points in the "future," as the touch event that they relate to was obtained after the touch event that is currently being reflected on the device display, and the display will be updated for these events during a future vertical blanking interval. Similar subscripts on the bars shown in the various rows of FIG. 1A, i.e., bars $125_x/135_x/145_x/155_x/165_x$ represent the various stages of processing the touch input from an event that will be displayed during a particular vertical blanking interval, x, throughout the graphics processing pipeline to the point of updating the device display according to the processed touch input. Bars representing the processing of touch input that is to be displayed during a particular vertical blanking interval, x, throughout the graphics processing pipeline are also shaded using a similar pattern in FIG. 1A for convenience.

Once at least one touch point has been obtained by the multi-touch detection hardware, the multi-touch information is passed to the graphics processing pipeline in order to process the obtained multi-touch scan data at row 120, ideally during the same first VBI. This pathway is represented by the arrow connecting block $115_0$ and $125_0$.

Then, at the beginning of the next-occurring VBI, e.g., a second VBI, the processed multi-touch scan data may be passed to the relevant application(s) running on the device for appropriate processing at row 130. This pathway is represented by the arrow connecting block $125_0$ and $135_0$. The processing by the application may then be completed within the second VBI, such that the processed application data may be animated, e.g., by a 2D/3D animation library such as OPEN GL® or CORE ANIMATION®, at row 140 (represented by the arrow connecting block $135_0$ and $145_0$) and rendered by one or more graphics processing units (GPU) at row 150 and written to a frame buffer, e.g., a multi-frame ring buffer, (represented by the arrow connecting block $145_0$ and $155_0$) within the next-occurring VBI, e.g., a third VBI. (CORE ANIMATION® is a registered trademark of APPLE INC.)

Finally, on the next-occurring VBI, e.g., a fourth VBI, the rendered graphical information may be written from the frame buffer to the device display at row 160 (represented by the arrow connecting block $155_0$ and $165_0$), thereby updating the pixel values on the device display to reflect the touch input originally obtained at bar $115_0$.

As may now be appreciated, the above-described process may consume at least four full VBI's from the time that the hardware begins to scan for multi-touch input until the time that the device's display is updated according to the obtained multi-touch input. In some applications, this amount of latency is undesirable. For example, as shown in FIG. 1A, with 16.667 ms VBIs, the span of four VBIs represents 66.7 ms, which may result in a perceptible amount of lag or "latency" to the user of the touch-sensitive electronic device that is deemed unacceptable. [Vertical dotted lines 105 represent the boundary between consecutive VBIs.]

Figure 1B:
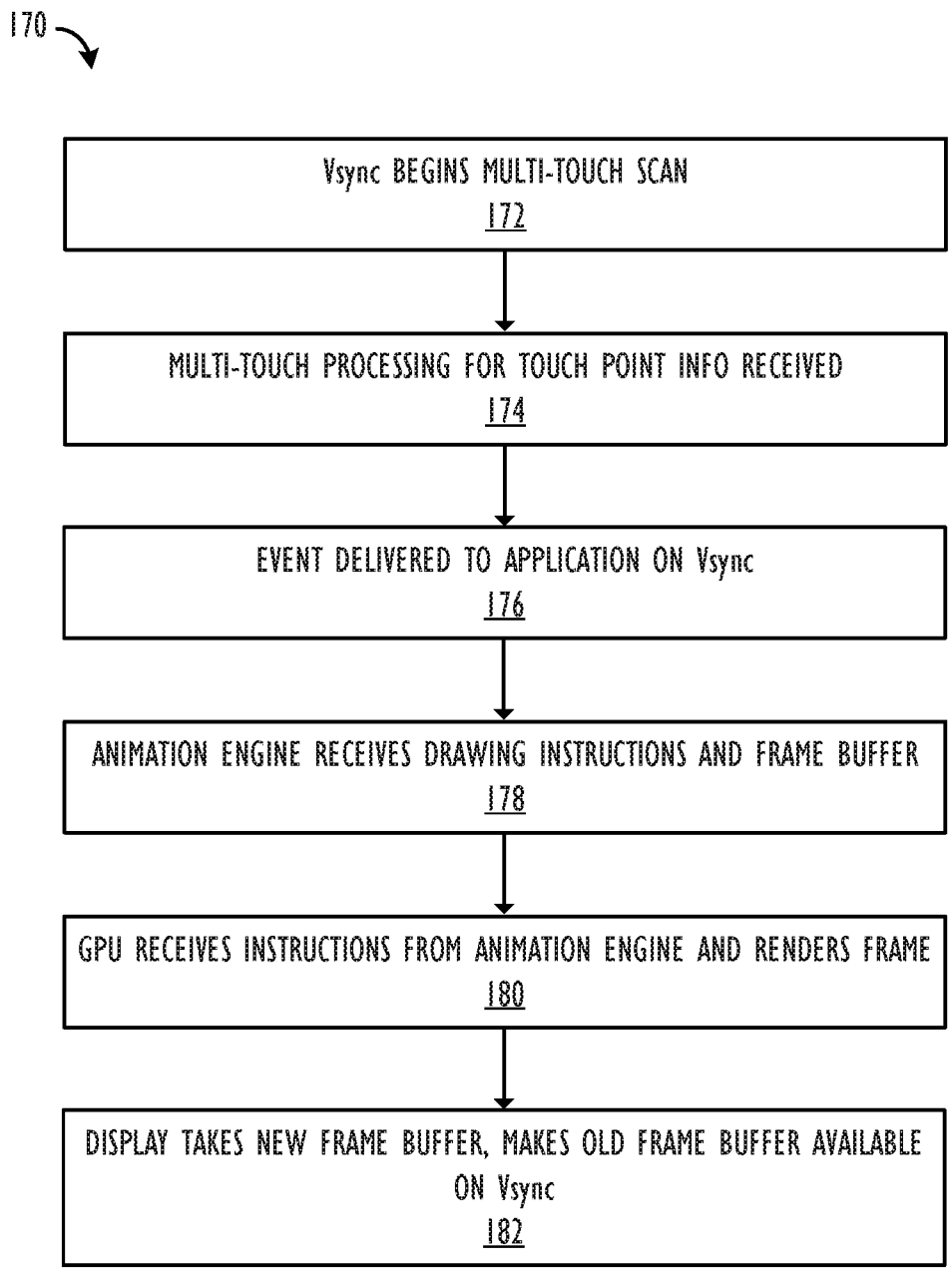
FIG. 1B shows, in flowchart form, a touch-to-display latency process with an ideal graphics workload, in accordance with the prior art.

Referring now to FIG. 1B, a touch-to-display latency process with an ideal graphics workload 170 is shown in flowchart form, in accordance with the prior art. As was previously explained in conjunction with FIG. 1A, first the multi-touch hardware's scanning process kicks off upon the receiving of a Vsync signal that begins a new VBI (Step 172). Next, the multi-touch processing for the obtained multi-touch information proceeds immediately upon the receipt of such multi-touch information from the hardware scanning process (Step 174). Next, the processed multi-touch event information is delivered to the relevant application(s) on the next Vsync signal, in order to allow the relevant application(s) enough time to perform the necessary processing (Step 176). Next, the relevant application(s) send their instructions to the desired animation library and obtain a frame buffer to draw into (Step 178). Next, the GPU immediately begins to render the updated graphical content to the frame buffer after getting its instructions from the animation engine (Step 180). Finally, the display takes the newly-written frame buffer and updates the pixels of the display to reflect the processed multi-touch information on the next Vsync signal, while making the old frame buffer available to be drawn into by the next processed multi-touch information (Step 182).

Figure 2A:
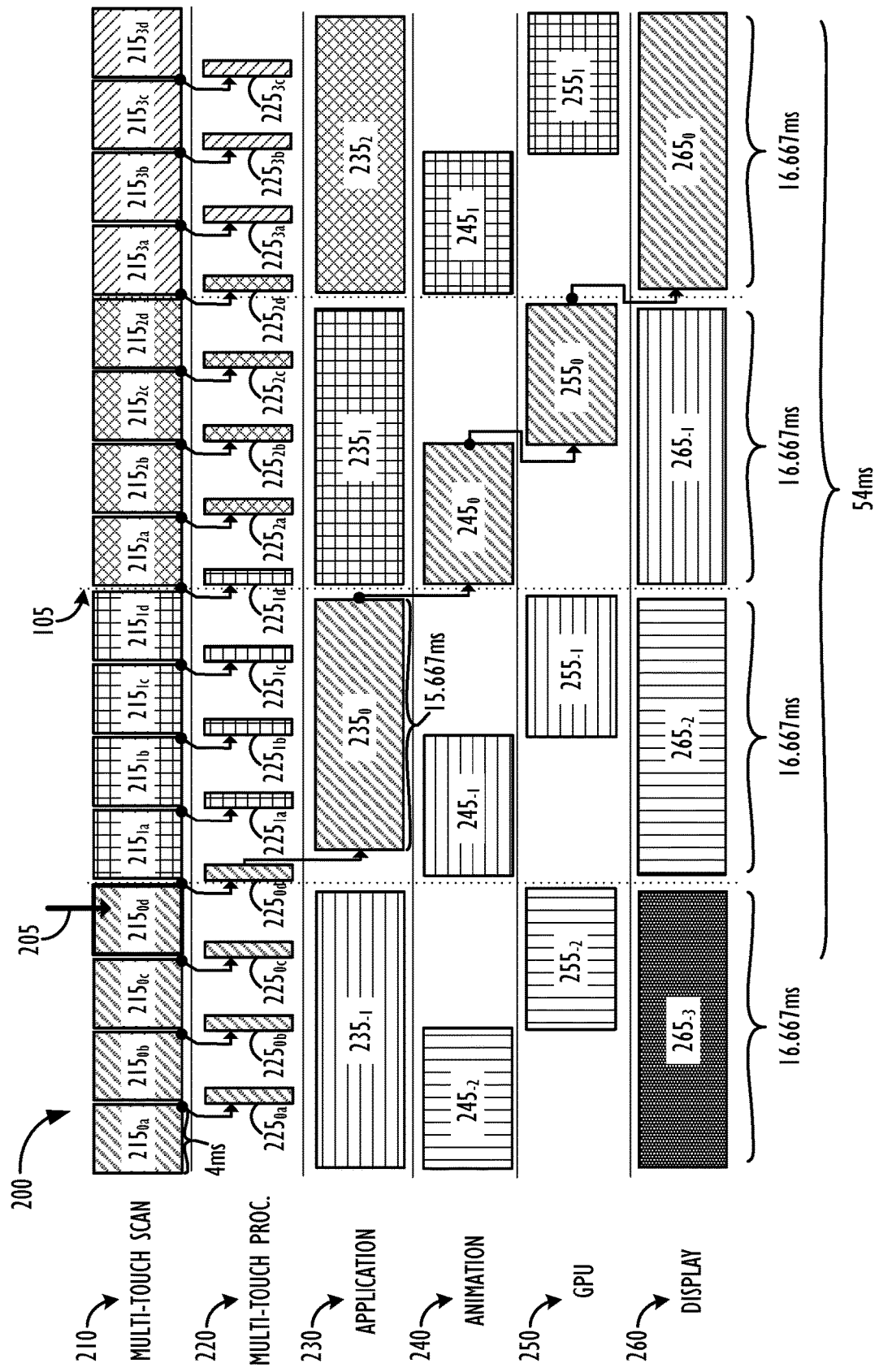
FIG. 2A shows, in timeline form, a touch-to-display latency breakdown with earliest possible touch set delivery, in accordance with at least one embodiment.

Referring now to FIG. 2A, a touch-to-display latency breakdown 200 with earliest possible touch set delivery is shown in timeline form, in accordance with at least one embodiment. As with FIG. 1A, the various rows of FIG. 2A represent the various steps in the graphics processing pipeline of a multi-touch enabled electronic device with a display screen. Process 200 first obtains a temporal sequence of multi-touch scan data 210 from its multi-touch hardware, e.g., during a first VBI. Bars 215 represent the amount of time during which the hardware multi-touch scan is taking place. Unlike the example breakdown of FIG. 1A, the breakdown of FIG. 2A shows four multi-touch sample points per VBI, i.e., $215_{0a}$, $215_{0b}$, $215_{0c}$, and $215_{0d}$. This means that each multi-touch scan takes approximately 4 ms of the 16.667 ms VBI. [As with FIG. 1A, the subscript '0' represents the content being displayed during the "current" VBI, negative subscripts represent content that was display during "past" VBIs, and positive subscripts represent content that will be displayed during "future" VBIs. Newly-added to FIG. 2A are the alphabetical subscripts, 'a,' 'b,' 'c,' and 'd,' on bars 215, which represent the first, second, third, and fourth multi-touch samples, respectively, within a given VBI.]

As mentioned above, FIG. 2A represents a touch-to-display latency breakdown with the earliest possible touch set delivery. In the example of FIG. 2A, the multi-touch scan 210 recognizes the touch input during bar $215_{0d}$, as represented by arrow 205, and then it is delivered to multi-touch processing row 220 at bar 225$0d$. [Multi-touch processing row 220 also has newly-added alphabetical subscripts, 'a,' 'b,' 'c,' and 'd,' on bars 225, which represent the first, second, third, and fourth multi-touch sample processing periods of approximately 1 ms, respectively, within a given VBI.]

From this point on, the process of FIG. 2A proceeds in accordance with the timeline of FIG. 1A, with the exception of the fact that, the processed multi-touch information is delivered to application row 230 at the earliest possible time in the second VBI. As illustrated, this takes place just 1 ms into the second VBI, such that the application processing bar, $235_0$, has 15.667 ms of the 16.667 ms VBI window to perform its processing (i.e., nearly the full amount of processing time to process the touches), before it has to deliver the information to the animation engine 240 at bar $245_0$ and GPU 250 at bar $255_0$ for processing during the third VBI, and eventual display 260 at bar $265_0$ during the fourth VBI. As may now be appreciated, the above-described process may consume at least three full VBIs and one-fourth of another VBI (i.e., the final 4 ms of the first VBI, during which the touch event 205 was initially detected by the multi-touch scan 210) from the time that the hardware begins to scan for multi-touch input until the time that the device's display is updated according to the obtained multi-touch input. Assuming the same 16.667 ms VBIs as with FIG. 1A, the span of three and one-fourth VBIs represents 54 ms, which represents a 13 ms decrease in response time over the 67 ms response time shown in the timeline of FIG. 1A. According to the scheme of FIG. 2A, the application is afforded the maximum time to process the touch information, but the minor performance improvements gained don't improve latency, as is reflected by the fact that the VBI displaying the "current" touch information, $265_0$, is still the fourth VBI in display row 260.

It is to be understood that, since FIG. 2A represents a scheme wherein the touch set is delivered at the earliest possible time, if the touch is detected at an earlier point in the first VBI, e.g., during any of bars $215_{0a}$, $215_{0b}$, or $215_{0c}$, the touch set could be delivered to multi-touch processing operation 220 at an earlier time, e.g., during any of bars $225_{0a}$, $225_{0b}$, or $225_{0c}$, which would allow the application processing at row 230 to take place in the same "first" VBI as the multi-touch detection and processing (assuming that such application processing could be completed in the remaining time in the first VBI), thus potentially shaving an additional 16.667 ms (i.e., one VBI window's-worth) of time off the display's response, and decreasing the latency by one VBI.

Figure 2B:
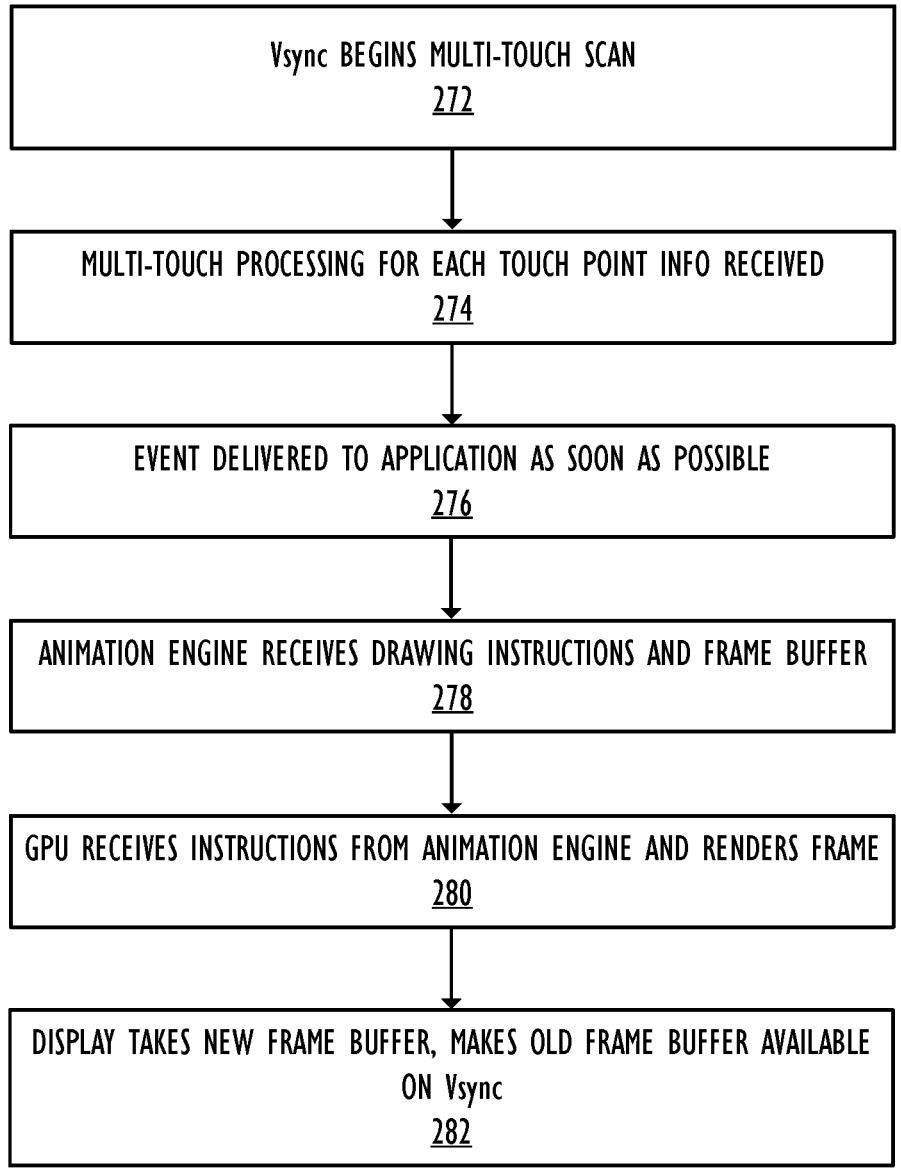
FIG. 2B shows, in flowchart form, a touch-to-display latency process with earliest possible touch set delivery, in accordance with at least one embodiment.

Referring now to FIG. 2B, a touch-to-display latency process with earliest possible touch set delivery 270 is shown in flowchart form, in accordance with at least one embodiment. As was previously explained in conjunction with FIG. 2A, first the multi-touch hardware's scanning process kicks off upon the receiving of a Vsync signal that begins a new VBI (Step 272). According to some embodiments multiple hardware scans are completed during a single VBI, e.g., four hardware scans per VBI, so that the touch information may be sent off to processing sooner. Next, the obtained multi-touch information from the hardware scan is processed (Step 274). Next, the processed multi-touch event information is delivered to the relevant application(s) at the earliest possible time after the next Vsync signal, in order to allow the relevant application(s) the maximum amount time to perform the necessary processing (Step 276). Next, the relevant application(s) send their instructions to the desired animation library and obtain a frame buffer to draw into (Step 278). Next, the GPU immediately begins to render the updated graphical content to the frame buffer after getting its instructions from the animation engine (Step 280). Finally, the display takes the newly-written frame buffer and updates the pixels of the display to reflect the processed multi-touch information on the next Vsync signal, while making the old frame buffer available to be drawn into by the next processed multi-touch information (Step 282).

Figure 3A:
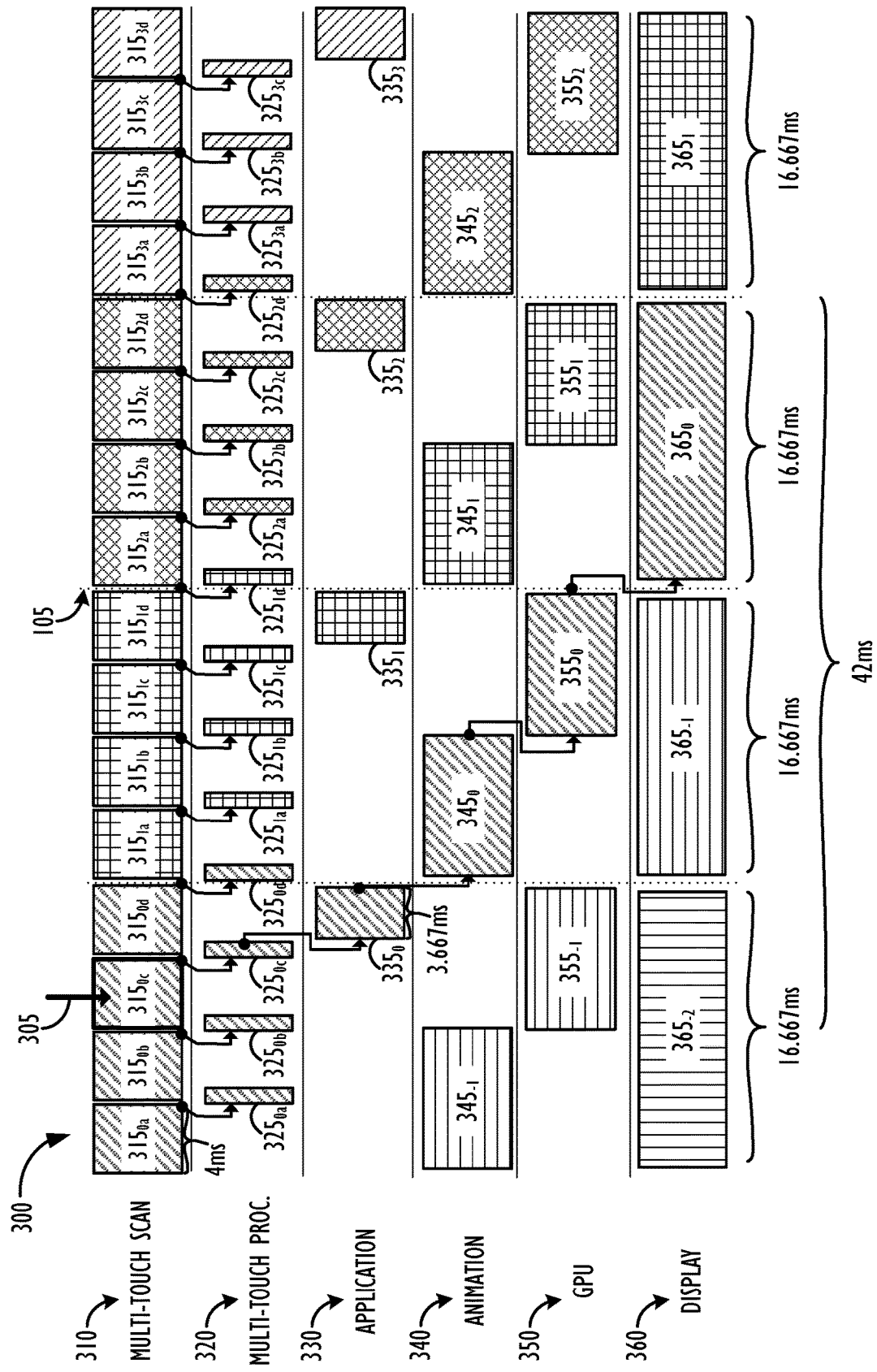
FIG. 3A shows, in timeline form, a touch-to-display latency breakdown with latest possible touch set delivery, in accordance with at least one embodiment.

Referring now to FIG. 3A, a touch-to-display latency breakdown 300 with latest possible touch set delivery is shown in timeline form, in accordance with at least one embodiment. In the example of FIG. 3A, the multi-touch scan 310 recognizes the touch input during bar $315_{0c}$, as represented by arrow 305, and then it is delivered to multi-touch processing row 320 at bar $325_{0c}$. [Multi-touch processing row 320 also has the alphabetical subscripts, 'a,' 'b,' 'c,' and 'd,' on bars 325, which were first mentioned with reference to FIG. 2A.]

From this point on, the process of FIG. 3A proceeds in accordance with the timeline of FIG. 2A, with the exception of the fact that, the processed multi-touch information is delivered to application row 330 at the latest possible time in the first VBI after which the application would still be able to finish its processing within the first VBI. As illustrated, this takes place just 3.667 ms before the end of the first VBI, such that the application processing bar, $335_0$, has only 3.667 ms of the 16.667 ms VBI window to perform its processing (i.e., a relatively small amount of processing time to process the touches), before it has to deliver the information to the animation engine 340 at bar 3450 and GPU 350 at bar $355_0$ for processing during the second VBI, and eventual display 360 at bar $365_0$ during the third VBI. As may now be appreciated, the above-described process may consume at least two full VBIs and some portion of another VBI (i.e., the final 8 ms of the first VBI, during which the touch event 305 was initially detected by the multi-touch scan 310) from the time that the hardware begins to scan for multi-touch input until the time that the device's display is updated according to the obtained multi-touch input. Assuming the same 16.667 ms VBIs as with FIG. 1A, the span of two and one-half VBIs represents about 42 ms, which represents a 25 ms decrease in response time over the 67 ms response time shown in the timeline of FIG. 1A. According to the scheme of FIG. 3A, the application is afforded the minimum time to process the touch information (which has a greater potential for "dropping" frames, i.e., in cases where the processing cannot be completed in time), but the performance improvements can achieve much better latency, as is reflected by the fact that the VBI displaying the "current" touch information, $365_0$, is the third VBI in display row 360, as opposed to the fourth VBI, as was the case in FIGS. 1A and 2A.

Figure 3B:
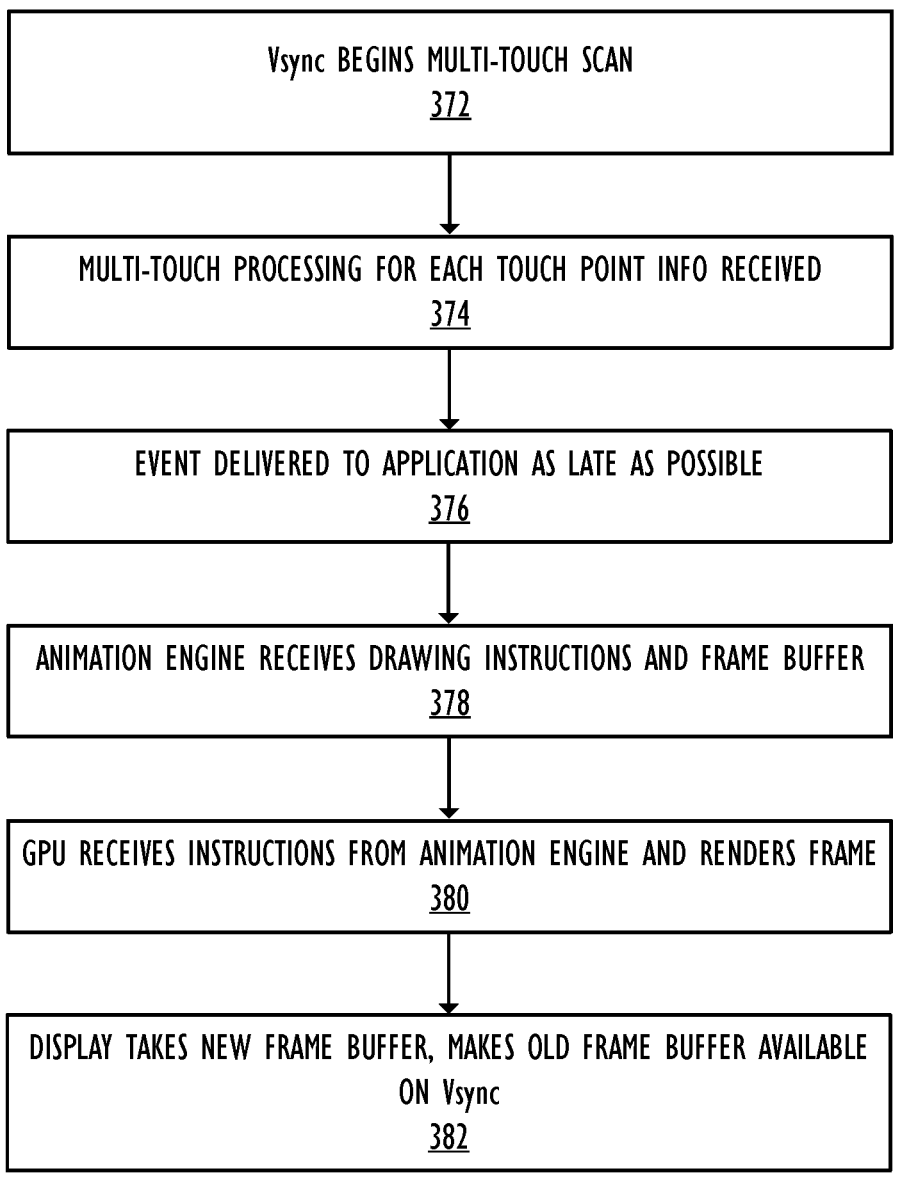
FIG. 3B shows, in flowchart form, a touch-to-display latency process with latest possible touch set delivery, in accordance with at least one embodiment.

Referring now to FIG. 3B, a touch-to-display latency process with latest possible touch set delivery 370 is shown in flowchart form, in accordance with at least one embodiment. As was previously explained in conjunction with FIG. 3A, first the multi-touch hardware's scanning process kicks off upon the receiving of a Vsync signal that begins a new VBI (Step 372). According to some embodiments multiple hardware scans are completed during a single VBI, e.g., four hardware scans per VBI, so that the touch information may be sent off to processing sooner. Next, the obtained multi-touch information from the hardware scan is processed (Step 374). Next, the processed multi-touch event information is delivered to the relevant application(s) at the latest possible time in the present VBI by which the application is likely to be able to finish the processing during the present VBI, in an attempt to decrease latency (Step 376). Next, the relevant application(s) send their instructions to the desired animation library and obtain a frame buffer to draw into (Step 378). Next, the GPU immediately begins to render the updated graphical content to the frame buffer after getting its instructions from the animation engine (Step 380). Finally, the display takes the newly-written frame buffer and updates the pixels of the display to reflect the processed multi-touch information on the next Vsync signal, while making the old frame buffer available to be drawn into by the next processed multi-touch information (Step 382).

Figure 4A:
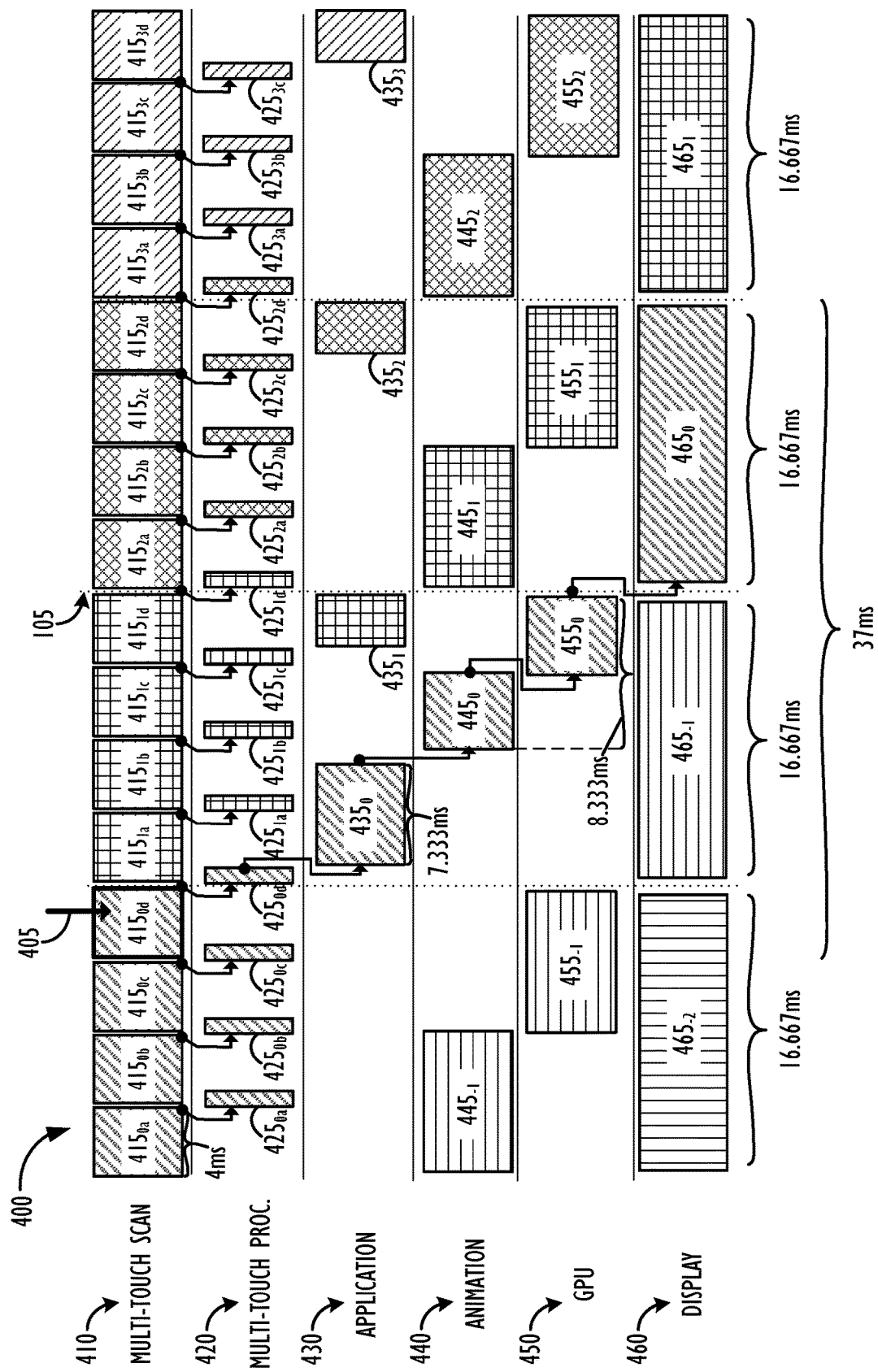
FIG. 4A shows, in timeline form, a touch-to-display latency breakdown with estimated optimal touch set delivery timing, in accordance with at least one embodiment.

Referring now to FIG. 4A, a touch-to-display latency breakdown 400 with estimated "optimal" touch set delivery timing is shown in timeline form, in accordance with at least one embodiment. In the example of FIG. 4A, the multi-touch scan 410 recognizes the touch input during bar $415_{0d}$, as represented by arrow 405, and then it is delivered to multi-touch processing row 420 at bar $425_{0d}$. [Multi-touch processing row 420 also has the alphabetical subscripts, 'a,' 'b,' 'c,' and 'd,' on bars 425, which were first mentioned with reference to FIG. 2A.]

From this point on, the process of FIG. 4A proceeds in accordance with the timeline of FIG. 3A, with the exception of the fact that, the processed multi-touch information is delivered to application row 430 at an estimated optimal time that will maximize the likelihood that the application will meet the next frame deadline (i.e., be able finish its processing within the same VBI as the animation and graphical rendering steps). As illustrated, this takes place just 1 ms into the second VBI, such that the application processing bar, $435_0$, has 7.333 ms of the 16.667 ms VBI window to perform its processing (i.e., a time of 7.333 ms was approximated as the amount of time that the application would need to process the touch information in this example, with 8.333 ms being approximated as the amount of time that would be needed by the animation engine and the GPU), before it has to deliver the information to the animation engine 440 at bar $445_0$ and GPU 450 at bar $455_0$, which are also estimated to be able to be completed during the second VBI, and eventual display 460 at bar $465_0$ during the third VBI. As may now be appreciated, the above-described process may consume at least two full VBIs and some portion of another VBI (i.e., the final 4 ms of the first VBI, during which the touch event 405 was initially detected by the multi-touch scan 410) from the time that the hardware begins to scan for multi-touch input until the time that the device's display is updated according to the obtained multi-touch input. Assuming the same 16.667 ms VBIs as with FIG. 1A, the span of two and one-fourth VBIs represents about 37 ms, which represents a 30 ms decrease in response time over the 67 ms response time shown in the timeline of FIG. 1A. According to the scheme of FIG. 4A, an approximation calculation is made to deliver the touch information to the application at the optimal delivery time to allow the completion of the application processing, animation, and rendering within the same VBI. Of course, this approach has the greatest potential latency gains, but also has the potential for "dropping" frames (i.e., in cases where the processing cannot be completed in time), when the approximations of application processing time turn out to be inaccurate. As with FIG. 3A, the performance improvements can help the graphics processing pipeline to achieve much better latency, as is reflected by the fact that the VBI displaying the "current" touch information, $465_0$, is the third VBI in display row 460, as opposed to the fourth VBI, as was the case in FIGS. 1A and 2A.

Figure 4B:
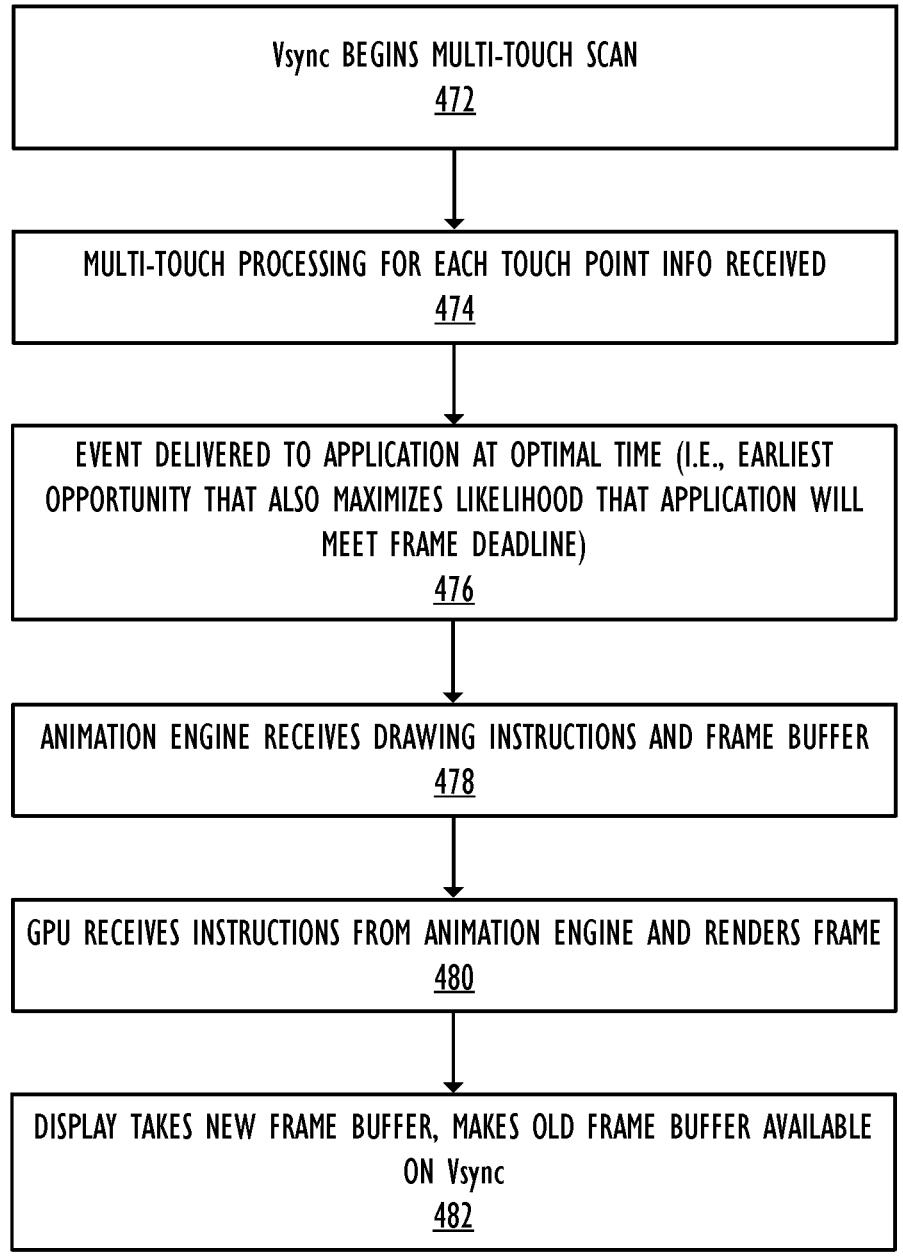
FIG. 4B shows, in flowchart form, a touch-to-display latency process with estimated optimal touch set delivery timing, in accordance with at least one embodiment.

Referring now to FIG. 4B, a touch-to-display latency process with estimated optimal touch set delivery timing 470 is shown in flowchart form, in accordance with at least one embodiment. As was previously explained in conjunction with FIG. 4A, first the multi-touch hardware's scanning process kicks off upon the receiving of a Vsync signal that begins a new VBI (Step 472). According to some embodiments multiple hardware scans are completed during a single VBI, e.g., four hardware scans per VBI, so that the touch information may be sent off to processing sooner. Next, the obtained multi-touch information from the hardware scan is processed (Step 474). Next, the processed multi-touch event information is delivered to the relevant application(s) at an "optimal" delivery time in the present VBI by which the application is likely to be able to finish the processing, and then animate and render the appropriate content during the present VBI, in an attempt to decrease latency (Step 476). Next, the relevant application(s) send their instructions to the desired animation library and obtain a frame buffer to draw into (Step 478). Next, the GPU begins to render the updated graphical content to the frame buffer after getting its instructions from the animation engine (Step 480). Finally, the display takes the newly-written frame buffer and updates the pixels of the display to reflect the processed multi-touch information on the next Vsync signal, while making the old frame buffer available to be drawn into by the next processed multi-touch information (Step 482). In some embodiments, the GPU rendering is pushed into the frame buffer according to the evaluation of a message latency heuristic. For example, according to some embodiments, a message that is evaluated as being "low latency" will attempt to be rendered within the current VBI, whereas a message that is evaluated as being "regular latency" will be scheduled to be rendered at the next available VBI. According to some embodiments, the evaluation of a message latency heuristic may also help the display device to avoid undesirable "beat patterns" within the display buffer.

Figure 4C:
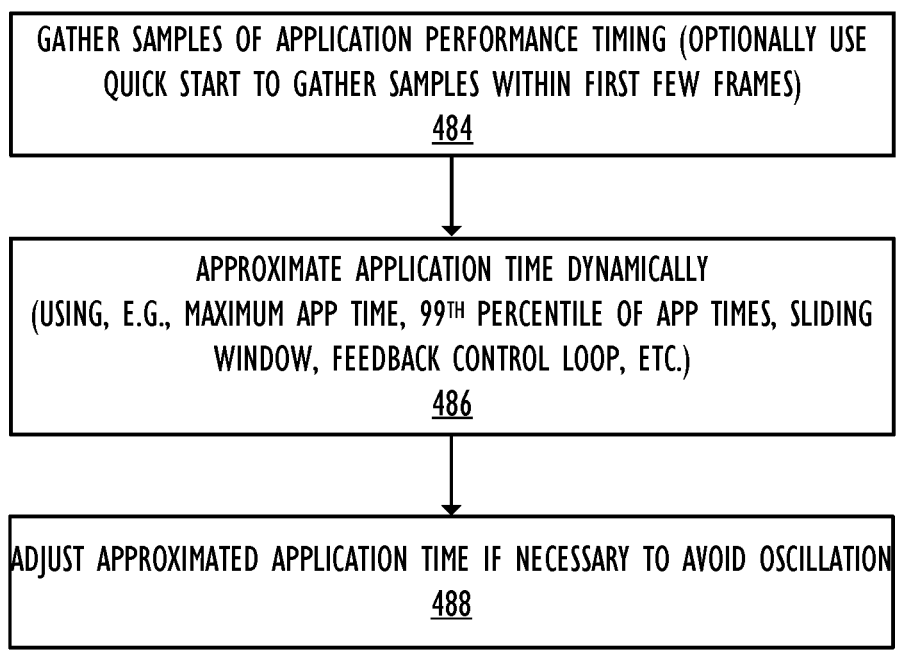
FIG. 4C shows, in flowchart form, exemplary methods of estimating optimal touch set delivery timing, in accordance with at least one embodiment.

Referring now to FIG. 4C, exemplary methods of estimating optimal touch set delivery timing 476 are shown in flow chart form, in accordance with at least one embodiment. First, the process may gather samples of application performance timing, optionally using a "quick start" approach to gather samples within the first few frames that are processed by the graphics processing pipeline (Step 484). Next, the process may dynamically approximate the application timing required by, e.g.: utilizing a maximum application performance time as the approximated application performance time; utilizing a maximum percentile of application performance times (e.g., the $99^{th}$ percentile of application performance times) as the approximated application performance time; utilizing a sliding window of application performance times to generate the approximated application performance time; and/or a utilizing a feedback control loop to adjust future approximated application performance times (Step 486). Finally, the process may adjust the approximated application time, if necessary, to avoid oscillation of the device display (Step 488).

Figure 5:
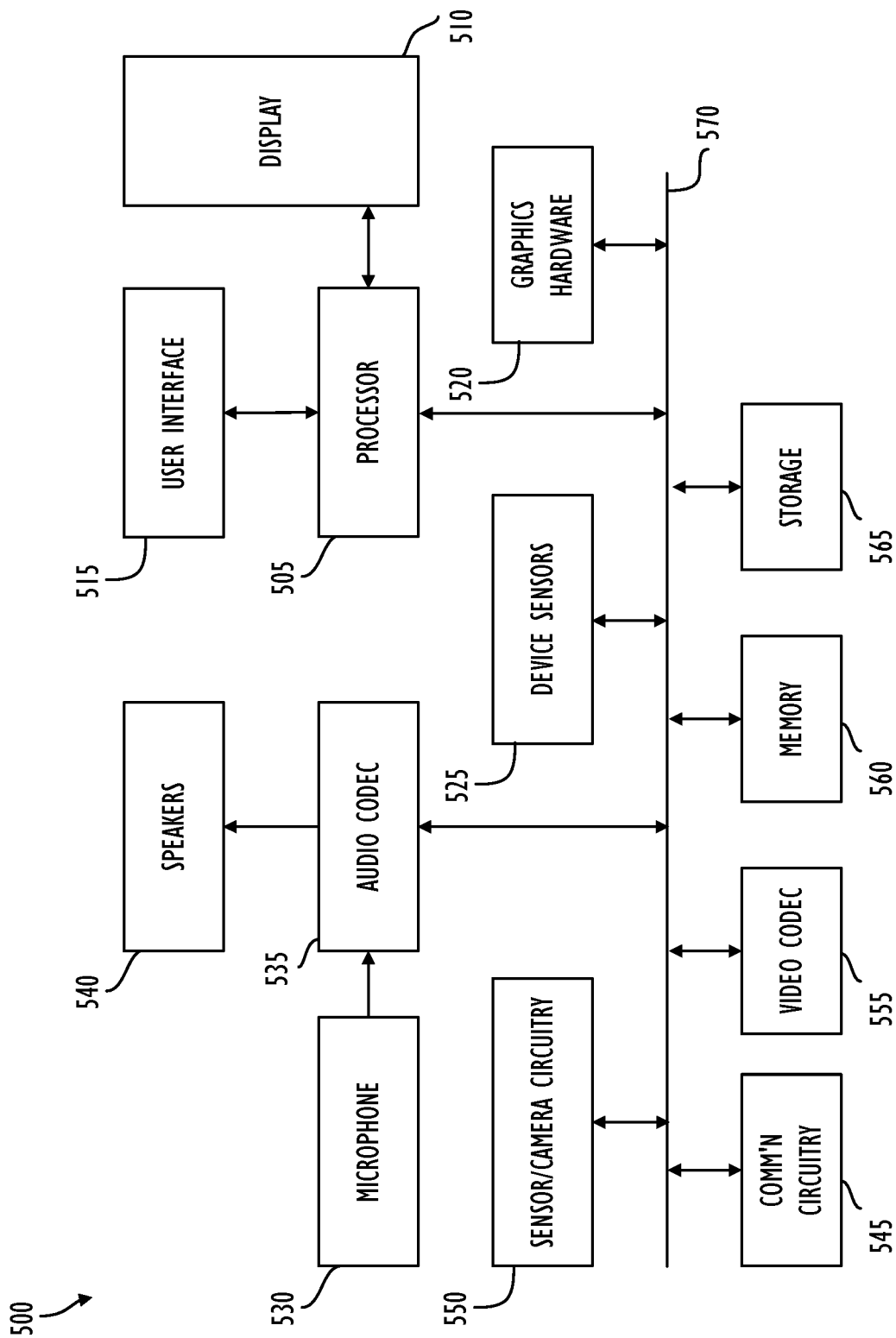
FIG. 5 shows, in block diagram form, a multi-function electronic device in accordance with one embodiment.

Referring now to FIG. 5, a simplified functional block diagram of illustrative electronic device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, image capture device or circuitry 550, video codec(s) 555, memory 560, storage 565, and communications bus 570.

Processor 505 may be a programmable control device operable to execute instructions necessary to carry out or control the operation of many functions performed by device 500 (e.g., such as the processing of multi-touch information in accordance with FIGS. 1A-4C). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may select when to capture an image. Processor 505 may be a system-on-chip such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to perform computational tasks. In one embodiment, graphics hardware 520 may include one or more programmable graphics processing units (GPUs).

Image capture device 550 may capture still and video images that may be processed to generate images and may include specialized hardware to perform some or many actions with image capture. Output from image capture device 550 may be processed (or further processed), at least in part by video codec(s) 555 and/or processor 505 and/or graphics hardware 520, and/or a dedicated image processing unit (not shown). Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). Image stabilization operations in accordance with this disclosure may be applied to processed versions of the captured images (e.g. edge-maps) or sub-sampled versions of the captured images. In addition, some of the described operations may have their individual steps performed in an order different from, or in conjunction with other steps, that presented herein. More generally, if there is hardware support, some operations described in conjunction with FIGS. 1A-4C may be performed in parallel.

In light of the above examples, the scope of the invention therefore should be determined with reference to the appended claims, along with the full scope of equivalents to which such claims are entitled.

The invention claimed is:

1. A non-transitory program storage device, readable by a programmable control device and comprising instructions stored thereon to cause one or more programmable control devices to:
    obtain a temporal sequence of multi-touch scan data from a touch-sensitive input device of an electronic device, wherein the temporal sequence of multi-touch scan data corresponds to a plurality of multi-touch scan periods within a first vertical blanking interval (VBI) of a display;
    process the multi-touch scan data to determine multi-touch event information;
    determine a performance time for processing the multi-touch event information by one or more applications based on a plurality of application performance timing samples, wherein the performance time is used to determine a delivery time, within a relevant VBI, at which to deliver the multi-touch event information to the one or more applications; and
    deliver, based on the delivery time, the multi-touch event information to the one or more applications within the relevant VBI.

2. The non-transitory program storage device of claim 1, wherein the instructions cause the one or more programmable control devices to perform a message latency heuristic that determines whether the content is rendered to the frame buffer within the relevant VBI or a next available VBI.

3. The non-transitory program storage device of claim 1, wherein the relevant VBI occurs after the first VBI.

4. The non-transitory program storage device of claim 1, wherein the instructions cause the one or more programmable control devices to:
    determine one or more graphical changes to be applied to the display in response to processing the delivered multi-touch event information by the one or more applications; and
    animate the one or more graphical changes within the relevant VBI.

5. The non-transitory program storage device of claim 1, wherein the multi-touch event information is indicative of one or more of the plurality of multi-touch scan periods.

6. The non-transitory program storage device of claim 1, wherein the instructions to cause the one or more programmable control devices to determine the performance time further comprises instructions to cause the one or more programmable control devices to determine an amount of time to animate and render one or more graphical changes in response to the one or more applications processing the multi-touch event information, and wherein the delivery time accounts for the amount of time.

7. The non-transitory program storage device of claim 1, wherein the relevant VBI and the first VBI are the same VBI.

8. The non-transitory program storage device of claim 1, wherein the instructions to cause the one or more programmable control devices to determine the performance time further comprises instructions to cause the one or more programmable control devices to:
    gather the samples of application performance timing for the one or more applications;
    approximate application time dynamically based on the gathered samples; and
    adjust the approximated application time to avoid oscillation, wherein the performance time corresponds to the adjusted approximated application time.

9. The non-transitory program storage device of claim 8, wherein the instructions to cause the one or more programmable control devices to approximate application time dynamically further comprises instructions to cause the one or more programmable control devices to determine at least one of the following: a maximum application performance time, a maximum percentile of application performance times, a sliding window of application performance times, or an output from a feedback control loop of application performance times.

10. A system comprising:
    a touch-sensitive input sensor;
    a display;
    memory; and
    one or more processors operable to interact with the touch-sensitive input sensor and the memory, and to perform operations comprising:
        obtaining a temporal sequence of multi-touch scan data from the touch-sensitive input sensor, wherein the temporal sequence of multi-touch scan data corresponds to a plurality of multi-touch scan periods within a first vertical blanking interval (VBI) of the display;
        processing the multi-touch scan data to determine multi-touch event information;
        determining a performance time for processing the multi-touch event information by one or more applications based on a plurality of application performance timing samples, wherein the performance time is used to determine a delivery time, within a relevant VBI, at which to deliver the multi-touch event information to the one or more applications; and delivering, based on the delivery time, the multi-touch event information to the one or more applications within the relevant VBI.

11. The system of claim 10, wherein the operations performed by the one or more processors further comprise performing a message latency heuristic that determines whether the content is rendered to the frame buffer within the relevant VBI or a next available VBI.

12. The system of claim 10, wherein the operations performed by the one or more processors further comprise:
  determining one or more graphical changes to be applied to the display in response to processing the delivered multi-touch event information by the one or more applications; and
  animating the one or more graphical changes within the relevant VBI.

13. The system of claim 10, wherein the relevant VBI occurs after that first VBI.

14. The system of claim 10, wherein the operations performed by the one or more processors for determining the performance time further comprises operations of:
  gathering the samples of application performance timing for the one or more applications;
  approximating application time dynamically based on the gathered samples; and
  adjusting the approximated application time to avoid oscillation, wherein the performance time corresponds to the adjusted approximated application time.

15. The system of claim 14, wherein the operations performed by the one or more processors for approximating application time further comprises operations of determining at least one of the following: a maximum application performance time, a maximum percentile of application performance times, a sliding window of application performance times, or an output from a feedback control loop of application performance times.

16. A method comprising:
  obtaining a temporal sequence of multi-touch scan data from a touch-sensitive input device of an electronic device, wherein the temporal sequence of multi-touch scan data corresponds to a plurality of multi-touch scan periods within a first vertical blanking interval (VBI) of a display;
  processing the multi-touch scan data to determine multi-touch event information;
  determining a performance time for processing the multi-touch scan data by one or more applications based on a plurality of application performance timing samples, wherein the performance time is used to determine a delivery time, within a relevant VBI, at which to deliver the multi-touch event information to the one or more applications,
  delivering, based on the delivery time, the multi-touch event information to one or more applications within the relevant VBI.

17. The method of claim 16, further comprising:
  determining one or more graphical changes to be applied to the display in response to processing the delivered multi-touch event information by the one or more applications; and
  animating the one or more graphical changes within the relevant VBI.

18. The method of claim 16, further comprising performing a message latency heuristic that determines whether the content is rendered to the frame buffer within the relevant VBI or a next available VBI.

19. The method of claim 16, wherein determining the performance time further comprises:
  gathering the samples of application performance timing for the one or more applications;
  approximating application time dynamically based on the gathered samples; and
  adjusting the approximated application time to avoid oscillation.

20. The method of claim 19, wherein approximating application time dynamically comprises determining at least one of the following: a maximum application performance time, a maximum percentile of application performance times, a sliding window of application performance times, or an output from a feedback control loop of application performance times.

21. The non-transitory program storage device of claim 1, wherein the delivery time maximizes a likelihood that a graphics processing pipeline is able to, within the relevant VBI, process the multi-touch event information by the one or more applications and render content associated with the multi-touch event information to a frame buffer.

22. The system of claim 10, wherein the delivery time maximizes a likelihood that a graphics processing pipeline is able to, within the relevant VBI, process the multi-touch event information by the one or more applications and render content associated with the multi-touch event information to a frame buffer.

23. The method of claim 16, wherein the delivery time maximizes a likelihood that a graphics processing pipeline operating on the electronic device is able to, within the relevant VBI, process the multi-touch event information by the one or more applications and render content associated with the multi-touch event information to a frame buffer.

* * * * *